(12) United States Patent
Rossello

(10) Patent No.: US 9,235,416 B2
(45) Date of Patent: Jan. 12, 2016

(54) METHOD FOR CHECKING THE OPERABILITY OF A DIGITAL SIGNAL PROCESSING UNIT OF A POSITION SENSOR AND POSITION ENCODER

(71) Applicant: Sick Stegmann GmbH, Donaueschingen (DE)

(72) Inventor: Mariano Rossello, Turin (IT)

(73) Assignee: SICK STEGMANN GMBH, Donaueschingen (DE)

( * ) Notice: Subject to any disclaimer, the term of this patent is extended or adjusted under 35 U.S.C. 154(b) by 578 days.

(21) Appl. No.: 13/687,179

(22) Filed: Nov. 28, 2012

(65) Prior Publication Data

US 2013/0185546 A1    Jul. 18, 2013

(30) Foreign Application Priority Data

Jan. 13, 2012 (EP) .................... 12151122

(51) Int. Cl.
*G06F 9/30* (2006.01)
*G01D 5/244* (2006.01)

(52) U.S. Cl.
CPC .......... *G06F 9/3005* (2013.01); *G01D 5/24428* (2013.01)

(58) Field of Classification Search
None
See application file for complete search history.

(56) References Cited

U.S. PATENT DOCUMENTS

| | | | | |
|---|---|---|---|---|
| 4,831,468 A | * | 5/1989 | Nishioka | .................... 360/51 |
| 5,784,636 A | * | 7/1998 | Rupp | ............... G06F 15/7867 |
| | | | | 712/200 |
| 7,168,042 B2 | * | 1/2007 | Braun et al. | ........... G05B 19/00 |
| | | | | 345/156 |
| 2006/0089818 A1 | | 4/2006 | Norell et al. | |
| 2008/0024330 A1 | * | 1/2008 | Rehmann et al. | ............... 341/50 |
| 2008/0278218 A1 | | 11/2008 | Fouts et al. | |
| 2010/0274993 A1 | * | 10/2010 | Golla et al. | ............. G06F 9/384 |
| | | | | 712/216 |
| 2011/0139971 A1 | * | 6/2011 | Phillips | .................... 250/231.13 |
| 2014/0136755 A1 | * | 5/2014 | Hyde et al. | .................... 711/103 |

OTHER PUBLICATIONS

European Search Report, Application No. EP 12 15 1122, mailed Jul. 9, 2012, six (6) pages.

* cited by examiner

*Primary Examiner* — Michael Sun

(74) *Attorney, Agent, or Firm* — Nath Goldberg & Meyer; Jerald L. Meyer; Rury L. Grisham

(57) ABSTRACT

A method for checking the operability of a digital signal processing unit of a position sensor, wherein the digital signal processing unit executes an instruction queue of N instructions one after another in sequences, wherein an additional number of x instructions is executed by the digital signal processing unit during each sequence, wherein the additional instructions are provided in a unit different from the memory, and that the results of the additional instructions are stored. The results of the additional instructions are read by a microcomputer. The results of the additional instructions are compared by the microcomputer with the expected results achieved by execution of identical additional instructions by the microcomputer or with expected results stored in the microcomputer. This includes a position encoder comprising a digital signal processing unit for calculating position information.

11 Claims, 1 Drawing Sheet

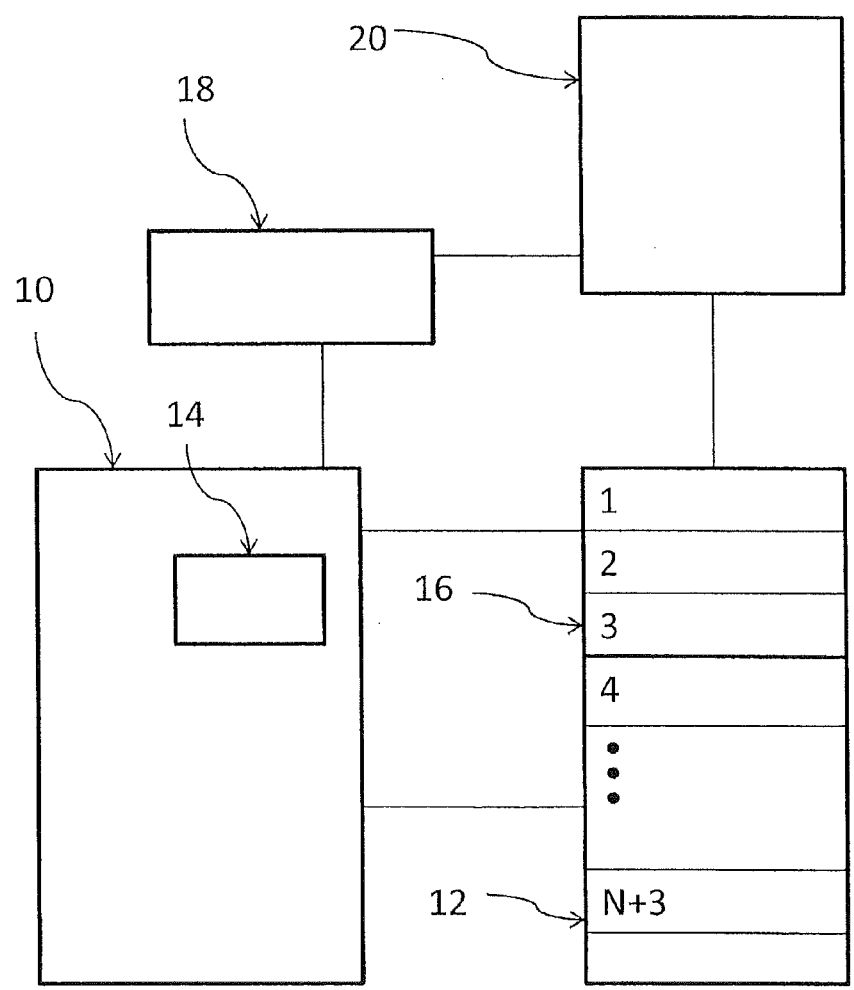

METHOD FOR CHECKING THE OPERABILITY OF A DIGITAL SIGNAL PROCESSING UNIT OF A POSITION SENSOR AND POSITION ENCODER

BACKGROUND

Technical Field

In numerous technical applications, it is important to obtain information on the phase of a rotating system at a given point of time, more specifically its angular position at said point of time. To obtain this information, one or more sensors are provided that generate data that are indicative of said phase and the data generated by the sensors are evaluated in order to obtain the desired phase information. The combination of sensors and hardware for the evaluation represents a device for controlling a rotating system. Specifically, position encoders, more specifically linear position encoders and rotary position encoders, belong to this class of devices.

There are well known digital signal processing units of position sensors, the digital signal processing unit executing an instruction queue of N instructions one after another in sequences, the instruction queue being provided in a memory.

In many applications it is crucial to be able to provide a system that is working even if there are malfunctions. Different Safety Integrity Levels (SIL) refer to relative levels of risk-reduction provided by a safety function. In order to reach the necessary reliability for a certain Safety Integrity Level (SIL), usually many features of internal diagnostic have to be set up.

A problem is that operability, correctness and functionality of computation units, for example of digital signal processing units, have to be continuously checked.

SUMMARY

This problem is solved by a method for checking the operability of a digital signal processing unit of a position sensor according to claim 1 and a position sensor according to claim 9.

Advantageous embodiments of the method and the device are obtained by the features of the dependent claims.

The method according to the present invention allows for checking the operability of a digital signal processing unit of a position sensor, wherein the digital signal processing unit executes an instruction queue comprising N instructions that is provided in a memory one after another in sequences. It comprises the step of executing an additional number of x instructions by the digital signal processing unit during each sequence, wherein the additional instructions are provided in a unit different or independent from the memory, and wherein the result or the results of the additional instructions are stored. In other words, the digital signal processing unit has an instruction queue which is always scanned from the beginning up to the end of the list in one sequence, this process being repeated several times, usually continuously. According to the invention, in each sequence additional instructions are executed. These additional instructions may be test instructions, for example simple calculation instructions. By providing additional instructions in a unit different from the memory it can be checked independently of the memory and therefore independently of the usual execution process whether the digital signal processing unit is calculating and working correctly. Furthermore, this check can be performed during run-time of the digital signal processing unit, because in each sequence the signal processing unit has to execute the additional instructions. It is to be noted that the unit can be any kind of storage unit. It is essential that the unit is not a part of that memory in which the instruction queue is stored and preferably not part of the memory at all but an independent separate storage unit.

According to a preferred embodiment of the invention the additional instructions are provided by a microcomputer to the unit. Therefore, the instructions are provided by an external unit, especially an external host processor.

Preferably the additional instructions are provided in a first separate storage unit, preferably a flip-flop-circuit. If the unit is a separate storage unit, malfunctions of the memory do not affect the unit. Flip-flop-circuits have the advantage of being robust low-cost devices.

Advantageously, the results of the additional instructions are held, especially stored in a second separate storage unit. By holding or storing the result of the additional instructions achieved by the digital signal processing unit in a further independent storage unit, it is possible to check this result independently of the digital signal processing unit.

Preferably, the results of the additional instructions are read by a microcomputer. In particular, the microcomputer that is necessary in the system anyway is used. This leads to a very compact and economic arrangement.

According to a preferred embodiment of the invention, the results of the additional instructions are compared by the microcomputer with the expected results achieved by execution of identical additional instructions by the microcomputer or with expected results stored in the microcomputer. Therefore, the results of the additional instructions are checked by an external unit. Especially, if the additional instructions are provided by the microcomputer and the result of the additional instructions is checked by the microcomputer, an external unit has control of the added unit for storing the additional instructions and can continuously feed the unit with additional instructions, especially test instructions. Preferably, the test instructions are taken from a list where the expected result is stored as well for easy checking whether the digital signal processing unit is calculating and working correctly.

In an embodiment, the additional instructions are the first instructions in each sequence. Therefore, the time slot in which the results of the additional instructions can be checked is maximized.

In a preferred embodiment of the invention, x is equal to 3. A number of three additional instructions is suitable to check whether the digital signal processing unit is performing correctly without adding to much calculation time that might cause time lag of the system.

A position encoder according to the present invention comprising a digital signal processing unit for calculating position information, the digital signal processing unit comprising a memory in which an instruction of N instructions is stored, the instruction queue being sequentially executed by the digital signal processing unit, further comprising a first separate storage unit which is different from the memory for storing an additional number of x instructions being executed by the digital signal processing unit during each sequence, and a second separate storage unit for storing the result of the additional instructions.

Preferably a microcomputer is provided for writing the additional instructions in the first separate storage unit and for reading the second separate storage unit.

According to a preferred embodiment of the invention the first separate storage unit is a flip-flop-circuit.

Next, the invention is explained in more detail using a FIGURE of an embodiment of the invention. The FIGURE show

BRIEF DESCRIPTION OF THE DRAWINGS

FIG. 1 a schematic block diagram of an embodiment of a part of a position sensor according to the invention.

DETAILED DESCRIPTION

FIG. 1 shows a schematic block diagram of an embodiment of a part of an Application Specific Integrated Circuit (ASIC) for a position encoder, for example a linear position encoder or a rotary position encoder, especially a capacitive rotary position encoder. In the ASIC, a digital signal processing unit 10 is implemented. The digital signal processing unit 10 executes an instruction queue of N instructions which are stored in a memory 12. The memory 12 might be part of the digital signal processing unit 10 or might be, as shown in the FIGURE, located somewhere on the ASIC being connected to the digital signal processing unit 10. The memory 12 might be any kind of storage unit and might be for example a Random-Access Memory (RAM).

According to the invention, a number of x additional instructions is provided in a unit different from the memory. The unit is for example a first separate storage unit 16. For example, a number of three additional instructions is provided in the first separate storage unit 16.

The digital signal processing unit 10 scans the instruction queue from the beginning up to the end in a sequence. The digital signal processing unit 10 comprises a program counter 14, which is increased by one each time an instruction is executed. Usually, the last instruction, in this case the N+3$^{rd}$ instruction, is a restart or return instruction to start the scanning process at the beginning of the instruction queue. According to the invention, the sequence comprises the number of N instructions stored in the memory 12 and the number of 3 additional instructions stored in the first separate storage unit 16, altogether N+3 instructions. In the embodiment shown in FIG. 1, the additional instructions are executed first before execution of the instruction queue of N instructions. The restart or return command therefore forces the digital signal processing unit 10 to execute in each sequence first the additional instructions stored in the first storage unit 16 and afterwards the instructions stored in the memory 10. The restart or return command is the only instruction that can affect the program counter 14, especially in that way that the program counter is reset.

The additional instructions stored in the first separate storage unit 16 are provided by a microcomputer 20. The instruction queue stored in the memory 12 usually is specified by the program. Therefore, the additional instructions are provided by a different device that the instructions queue of N instructions which allows an independent check of the operability of the digital signal processing unit 10 as described as follows.

The first separate storage unit 16 might be any kind of storage unit and might be for example a register, for example a flip-flop-circuit.

Furthermore, a second separate storage unit 18 is provided which holds or stores the result of the additional instructions. The second separate storage unit 18 might be any kind of storage unit and might be for example a register, for example a flip-flop-circuit. After execution of the additional instructions, the digital signal processing unit 10 writes the result or the results in the second separate storage unit 18. The result of the additional instructions is read by the microcomputer 20.

A check of the operability of the digital signal processing unit 10 can be performed as follows. The microcomputer 20 as an external host processer has control of the added first separate storage unit 16 and continuously feeds it with additional instructions. The microcomputer 20 furthermore either has a list where the expected result of the additional instructions is stored as well or executes the additional instructions itself. During each sequence, the digital signal processing unit 10 executes the additional instructions stored in the first separate storage unit 16 and writes the result or the results in the second separate storage unit 18. The microcomputer 20 reads the result of the additional instructions and compares the result achieved by the digital signal processing unit 10 with the result achieved by execution of identical additional instructions by the microcomputer 20 or with the result stored in a list in the microcomputer 20. If the results match, the digital signal processing unit 10 calculates correctly and operability is checked. In addition, not only the calculation performance of the digital signal processing unit 10 is checked but the program counter progression of the digital signal processing unit 10 as well. Especially, operability of the digital signal processing unit 10 can be checked continuously and during run-time. If the results do not match, the microcomputer 20 triggers an alarm.

REFERENCE NUMBERS

10 digital signal processing unit
12 memory
14 program counter
16 first separate storage unit
18 second separate storage unit
20 microcomputer

The invention claimed is:

1. A method for checking the operability of a digital signal processing unit (10) of a position sensor, wherein the digital signal processing unit (10) executes an instruction queue comprising N instructions one after another in sequences, the instruction queue being provided in a memory (12),
   characterized in that an additional number of x instructions is executed by the digital signal processing unit (10) during each sequence, wherein the additional instructions are provided in a unit (16) different from the memory (12), and that the results of the additional instructions are stored.

2. The method according to claim 1,
   characterized in that the additional instructions are provided by a microcomputer (20) to the unit (16).

3. The method according to one of the preceding claims,
   characterized in that the additional instructions are provided in a first separate storage unit (16), preferably a flipflop-circuit.

4. The method according to one of the preceding claims,
   characterized in that the results of the additional instructions are stored in a second separate storage unit (18).

5. The method according to one of the preceding claims,
   characterized in that the results of the additional instructions are read by a microcomputer (20).

6. The method according to claim 5,
   characterized in that the results of the additional instructions are compared by the microcomputer (20) with the expected results achieved by execution of identical additional instructions by the microcomputer (20) or with expected results stored in the microcomputer (20).

7. The method according to one of the preceding claims,
   characterized in that the additional instructions are the first instructions in each sequence.

8. The method according to one of the preceding claims,
   characterized in that x is equal to 3.

9. A position encoder comprising a digital signal processing unit (10) for calculating position information, the digital signal processing unit (10) comprising a memory (12) in which an instruction queue comprising N instructions is stored, the instruction queue being sequentially executed by the digital signal processing unit (10), characterized in that a first separate storage unit (16) which is different from the memory (12) is provided for storing an additional number of x instructions being executed by the digital signal processing unit (10) during each sequence, and a second separate storage unit (18) is provided for storing the result of the additional instructions.

10. The position encoder according to claim 9, characterized in that a microcomputer (20) is provided for writing the additional instructions in the first separate storage unit (16) and for reading the second separate storage unit (18).

11. The position encoder according to claim 9 or 10, characterized in that the first separate storage unit (16) is a flipflop-circuit.

\* \* \* \* \*